(12) United States Patent
Kim

(10) Patent No.: US 9,827,973 B2
(45) Date of Patent: Nov. 28, 2017

(54) METHOD AND DEVICE FOR LEARNING ENGINE CLUTCH DELIVERY TORQUE OF HYBRID VEHICLE

(71) Applicant: Hyundai Motor Company, Seoul (KR)

(72) Inventor: Do Hee Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 191 days.

(21) Appl. No.: 14/941,926

(22) Filed: Nov. 16, 2015

(65) Prior Publication Data
US 2017/0088116 A1    Mar. 30, 2017

(30) Foreign Application Priority Data

Sep. 25, 2015 (KR) .......................... 10-2015-0137068

(51) Int. Cl.
*B60W 10/08*   (2006.01)
*B60K 6/387*   (2007.10)
(Continued)

(52) U.S. Cl.
CPC ............. *B60W 20/11* (2016.01); *B60K 6/387* (2013.01); *B60W 10/02* (2013.01); *B60W 10/08* (2013.01);
(Continued)

(58) Field of Classification Search
CPC ...... B60W 20/00; B60W 20/10; B60W 20/11; B60W 20/15; B60W 20/17; B60W 20/18;
(Continued)

(56) References Cited

U.S. PATENT DOCUMENTS

| | | | |
|---|---|---|---|
| 9,592,824 B1 * | 3/2017 | Kim ........................ | B60K 6/387 |
| 2008/0066457 A1 * | 3/2008 | Kim ........................ | B60K 6/48 |
| | | | 60/286 |

(Continued)

FOREIGN PATENT DOCUMENTS

| | | |
|---|---|---|
| DE | 10 2012 224 278 A1 | 3/2014 |
| JP | 2014-061750 A | 4/2014 |

(Continued)

OTHER PUBLICATIONS

Extended European Search Report for European Patent Application No. 15196284.2, dated Dec. 2, 2016, 6 pages.

*Primary Examiner* — Thomas G Black
*Assistant Examiner* — Sara Lewandroski
(74) *Attorney, Agent, or Firm* — Mintz Levin Cohn Ferris Glovsky and Popeo, P.C.; Peter F. Corless

(57) ABSTRACT

A method for learning engine clutch delivery torque of a hybrid vehicle includes: determining, by a controller, whether power transference of a transmission transmitting output from an engine of the vehicle and a motor of the vehicle is interrupted; controlling, by the controller, a speed of the motor to be maintained at a first speed when the power transference of the transmission is interrupted; calculating, by the controller, a first delivery torque of an engine clutch that connects the engine with the motor or disconnects the engine from the motor, based on the first speed and a second speed of the motor which is generated after the engine clutch is engaged; controlling, by the controller, the speed of the motor to be maintained at the second speed by releasing the engine clutch after the first delivery torque is calculated; and calculating, by the controller, a second delivery torque of the engine clutch based on the second speed and a third speed of the motor which is generated after the engine clutch is engaged.

13 Claims, 4 Drawing Sheets

(51) Int. Cl.
*B60W 10/02* (2006.01)
*B60W 20/11* (2016.01)
*B60K 6/442* (2007.10)
*B60W 20/50* (2016.01)
*B60W 20/00* (2016.01)
*B60K 6/38* (2007.10)

(52) U.S. Cl.
CPC ............ *B60K 6/38* (2013.01); *B60K 6/442* (2013.01); *B60W 20/00* (2013.01); *B60W 20/50* (2013.01); *B60Y 2300/425* (2013.01); *B60Y 2300/426* (2013.01); *B60Y 2300/427* (2013.01); *B60Y 2300/428* (2013.01); *Y10S 903/905* (2013.01); *Y10S 903/906* (2013.01); *Y10S 903/907* (2013.01)

(58) Field of Classification Search
CPC ...... B60W 20/19; B60W 20/20; B60W 20/40; B60W 20/50; B60W 10/02; B60W 10/023; B60W 10/026; B60W 10/04; B60W 10/08; B60K 6/20; B60K 6/22; B60K 6/38; B60K 6/383; B60K 6/387; B60K 6/42; B60K 6/44; B60K 6/442; B60K 6/445; B60K 6/448; B60K 6/46; B60K 6/485; B60K 2006/381; B60K 2006/4808; B60Y 2300/42; B60Y 2300/425; B60Y 2300/426; B60Y 2300/427; Y10S 903/00; Y10S 903/912; Y10S 903/913; Y10S 903/914; Y10S 903/946

See application file for complete search history.

(56) References Cited

U.S. PATENT DOCUMENTS

| | | | |
|---|---|---|---|
| 2009/0048747 A1* | 2/2009 | Stridsberg | B60K 6/387 701/55 |
| 2010/0250037 A1* | 9/2010 | Yoshida | B60K 6/365 701/22 |
| 2012/0290163 A1* | 11/2012 | Inagaki | B60K 6/48 701/22 |
| 2013/0317683 A1 | 11/2013 | Terakawa et al. | |
| 2013/0325231 A1* | 12/2013 | Park | B60W 20/10 701/22 |
| 2014/0067174 A1* | 3/2014 | Park | F16H 61/061 701/22 |
| 2014/0148306 A1* | 5/2014 | Kim | B60W 10/02 477/5 |
| 2015/0298690 A1* | 10/2015 | Onouchi | B60K 6/48 701/22 |
| 2015/0321661 A1* | 11/2015 | Hayashi | B60W 10/02 701/22 |
| 2017/0120897 A1* | 5/2017 | Park | B60W 30/18072 |

FOREIGN PATENT DOCUMENTS

| | | |
|---|---|---|
| JP | 2014-162360 A | 9/2014 |
| JP | 2015-081031 A | 4/2015 |
| KR | 2013-0136779 A | 12/2013 |
| KR | 10-1371482 B1 | 3/2014 |
| KR | 10-2014-0072520 A | 6/2014 |

\* cited by examiner

METHOD AND DEVICE FOR LEARNING ENGINE CLUTCH DELIVERY TORQUE OF HYBRID VEHICLE

CROSS-REFERENCE TO RELATED APPLICATION

This application claims priority to and the benefit of Korean Patent Application No. 10-2015-0137068 filed in the Korean Intellectual Property Office on Sep. 25, 2015, the entire contents of which being incorporated herein by reference.

BACKGROUND OF THE DISCLOSURE (a) Technical Field

The present disclosure relates generally to a hybrid vehicle (or a hybrid electric vehicle), and more particularly, to a method and a device for learning engine clutch delivery torque of a hybrid vehicle.

(b) Description of the Related Art

Environmentally-friendly vehicles include fuel cell vehicles, electric vehicles, plug-in electric vehicles, and hybrid vehicles. Such vehicles typically include a motor to generate driving force.

As an example, a hybrid vehicle uses an internal combustion engine and power generated by a battery together. In other words, the hybrid vehicle efficiently combines power of the internal combustion engine and power of a motor.

The typical hybrid vehicle can consist of an engine, a motor, an engine clutch to adjust power between the engine and the motor, a transmission, a differential gear apparatus, a battery, and a starter-generator that starts the engine or generates electricity by output of the engine. Further, the hybrid vehicle can consist of a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery. The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery. It is possible to ensure drivability of the hybrid vehicle by engaging the engine clutch after a speed of the engine and a speed of the motor are synchronized in order to maintain a constant torque during power transmission between the engine and the motor, when changing from the EV mode to the HEV mode.

However, it is necessary to control the engine clutch to slip and be engaged under driving conditions when the battery is maintained in a low state of charge (SOC), when the temperatures of the battery and the motor are above a reference temperature condition, and when the road that the vehicle travels on has a steep slope. Additionally, it is necessary to control the pressure of the clutch to control the engine clutch to slip under the driving conditions.

Delivery torque of the engine clutch, which is torque transmitted by physical contact of two friction members that are included in the engine clutch, can be estimated from hydraulic pressure supplied to the engine clutch and the friction coefficient of the friction members. Controlling the engine clutch is an important factor that determines the drivability and the fuel consumption in operation of the hybrid vehicle. The friction coefficient can be changed by a deviation in hydraulic pressure depending on a current provided to a solenoid valve operating the engine clutch, aging of the solenoid valve, and degradation of the friction members. A change of the friction coefficient can cause a deviation in the delivery torque of the engine clutch.

As described above, it is difficult to precisely control the engine clutch in a hybrid vehicle because a deviation is generated by deterioration of the parts included in the engine clutch, thereby decreasing drivability and fuel economy. Accordingly, it may be necessary to correct the deviation by learning the delivery torque of the engine clutch in the hybrid vehicle.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide a method and a device for learning engine clutch delivery torque of a hybrid vehicle which are capable of learning engine clutch delivery torque depending on multiple speeds by using multiple speed control (or no-load torque compensation control) of a driving motor in a learning time (e.g., a park stage or a neutral stage of a transmission) of the engine clutch delivery torque.

Embodiments of the present disclosure provide a method for learning engine clutch delivery torque of the hybrid vehicle, including: determining, by a controller, whether power transference of a transmission transmitting output from an engine of the vehicle and a motor of the vehicle is interrupted; controlling, by the controller, a speed of the motor to be maintained at a first speed when the power transference of the transmission is interrupted; calculating, by the controller, a first delivery torque of an engine clutch that connects the engine with the motor or disconnects the engine from the motor, based on the first speed and a second speed of the motor which is generated after the engine clutch is engaged; controlling, by the controller, the speed of the motor to be maintained at the second speed by releasing the engine clutch after the first delivery torque is calculated; and calculating, by the controller, a second delivery torque of the engine clutch based on the second speed and a third speed of the motor which is generated after the engine clutch is engaged.

The controller may determine that the power transference of the transmission is interrupted when the transmission is in a park stage or a neutral stage.

The method for learning engine clutch delivery torque of the hybrid vehicle may further include: controlling, by the controller, the speed of the motor to be maintained at the third speed by releasing the engine clutch after the second delivery torque is calculated; and calculating, by the controller, a third delivery torque of the engine clutch based on the third speed and a fourth speed of the motor which is generated after the engine clutch is engaged.

The method for learning engine clutch delivery torque of the hybrid vehicle may further include: determining, by the controller, whether the third speed is less than or equal to a learning limit speed which restricts learning for delivery torque of the engine clutch; and terminating, by the controller, learning for delivery torque of the engine clutch when the third speed is less than or equal to the learning limit speed.

The first delivery torque may be a product of moment of inertia of the motor and a value obtained by subtracting the first speed from the second speed. The second delivery torque may be the product of moment of inertia of the motor and a value obtained by subtracting the second speed from the third speed.

A speed of the engine may be different from the first speed and the second speed.

Furthermore, according to embodiments of the present disclosure, a device for learning engine clutch delivery torque of the hybrid vehicle includes: an engine clutch which connects an engine of the vehicle with a motor of the vehicle or disconnects the engine from the motor; and a controller which controls a speed of the motor to be maintained at a first speed when power transference of a transmission transmitting output from the engine and the motor is interrupted, calculates a first delivery torque of the engine clutch based on the first speed and a second speed of the motor which is generated after the engine clutch is engaged, controls the speed of the motor to be maintained at the second speed by releasing the engine clutch, and calculates a second delivery torque of the engine clutch based on the second speed and a third speed of the motor which is generated after the engine clutch is engaged.

The controller may determine that the power transference of the transmission is interrupted when the transmission is in a park stage or a neutral stage.

The controller may control the speed of the motor to be maintained at the third speed by releasing the engine clutch. The controller may calculate a third delivery torque of the engine clutch based on the third speed and a fourth speed of the motor which is generated after the engine clutch is engaged.

The controller may determine whether the third speed is less than or equal to a learning limit speed which restricts learning for delivery torque of the engine clutch, and may terminate learning for delivery torque of the engine clutch when the third speed is less than or equal to the learning limit speed.

The first delivery torque may be a product of a moment of inertia of the motor and a value obtained by subtracting the first speed from the second speed, and the second delivery torque may be the product of a moment of inertia of the motor and a value obtained by subtracting the second speed from the third speed.

A speed of the engine may be different from the first speed and the second speed.

Furthermore, according to embodiments of the present disclosure, a non-transitory computer readable medium containing program instructions for learning engine clutch delivery torque of a hybrid vehicle includes: program instructions that determine whether power transference of a transmission transmitting output from an engine of the vehicle and a motor of the vehicle is interrupted; program instructions that control a speed of the motor to be maintained at a first speed when the power transference of the transmission is interrupted; program instructions that calculate a first delivery torque of an engine clutch that connects the engine with the motor or disconnects the engine from the motor, based on the first speed and a second speed of the motor which is generated after the engine clutch is engaged; program instructions that control the speed of the motor to be maintained at the second speed by releasing the engine clutch after the first delivery torque is calculated; and program instructions that calculate a second delivery torque of the engine clutch based on the second speed and a third speed of the motor which is generated after the engine clutch is engaged.

The no-load torque compensation control of the driving motor according to embodiments of the present disclosure may compensate only no-load torque depending on the speed of the motor to constantly maintain the speed of the motor. Accordingly, when the engine clutch is engaged, the speed of the motor may decrease, and thus the engine clutch delivery torque in the multiple speeds of the motor may be easily learned.

The method and the device for learning engine clutch delivery torque of the hybrid vehicle according to embodiments of the present disclosure may use the multiple speeds of the motor to learn the delivery torque of the engine clutch. Accordingly, the engine clutch delivery torque may be robustly learned.

Further, embodiments of the present disclosure may improve accuracy of delivery torque estimation through learning of the engine clutch delivery torque depending on the multiple speeds.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

Figure 1:
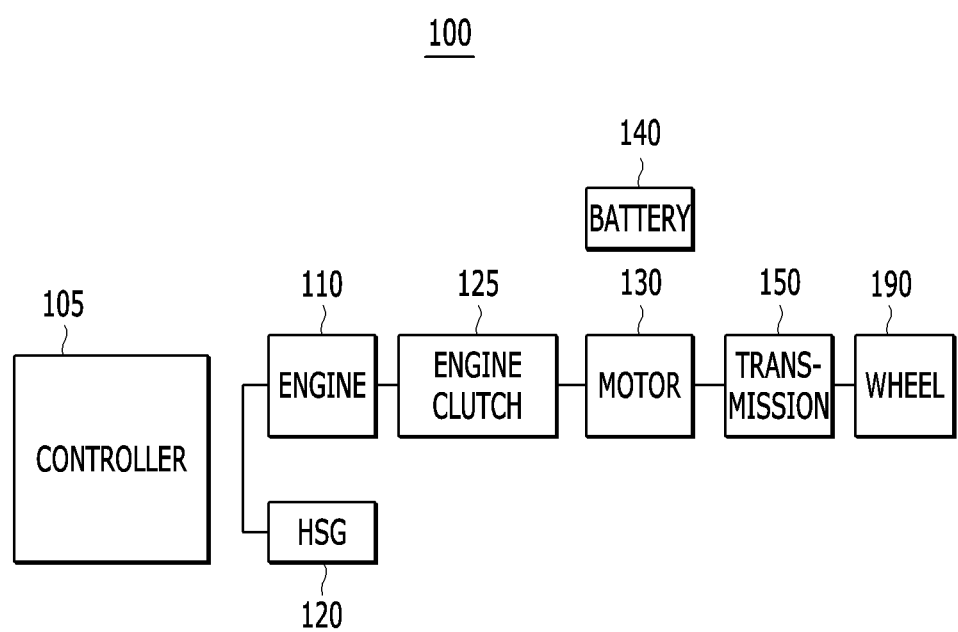
FIG. 1 is a view for explaining a hybrid vehicle including a device for learning engine clutch delivery torque according to embodiments of the present disclosure.

In order to sufficiently understand the present disclosure and the object achieved by embodying the present disclosure, the accompanying drawings illustrating embodiments of the present disclosure and contents described in the accompanying drawings are to be referenced. Hereinafter, the present disclosure will be described in detail by describing embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In a hybrid vehicle, engagement of an engine clutch has a significant effect on power delivery and drivability. Therefore, to provide stable and rapid power delivery, a change in characteristics of the engine clutch is found by consistently executing learning of engine clutch delivery torque. However, there are many adverse effects when characteristic information of the engine clutch that is learned in specific conditions is applied to the hybrid vehicle under general conditions. Accordingly, it may be necessary to eliminate the adverse effects such as drivability deterioration and wear of hardware (e.g., an engine clutch) that are due to a mismatch in the characteristic information.

The related art performs the learning of engine clutch delivery torque to generate a learning value at only a specific speed of a motor (or a driving motor), and uses the learning value when the engine clutch is engaged at a speed of the motor different from the specific speed. Therefore, accuracy of engine clutch engagement is reduced, deviation of the engine clutch engagement occurs, and abrasion of hardware such as the engine clutch may be accelerated.

The related art uses a differential value of a motor speed in determination of the delivery torque, and thus may be susceptible to noise and may reduce robustness of engine clutch delivery torque learning. The related art uses feedback control for speed control of the motor, and thus performs the delivery torque learning depending on only a single speed. Therefore, if the speed control of the motor is used so as to learn the delivery torque depending on multiple speeds, the speed control should be resumed after an additional target speed is designated. Accordingly, a time lag for the delivery torque learning occurs and fuel efficiency of the vehicle deteriorates due to unnecessary energy consumption. Further, in the case of the speed control of the motor according to the related art, a target speed of the motor should be designated consistently and there is a tendency that the designated speed of the motor returns to the original speed after the learning. Accordingly, multiple delivery torque learning of the engine clutch may be difficult.

Referring now to the disclosed embodiments, FIG. 1 is a view for explaining a hybrid vehicle including a device for learning engine clutch delivery torque according to embodiments of the present disclosure.

As shown in FIG. 1, the hybrid vehicle 100 includes a controller 105, an engine 110, a hybrid starter-generator (HSG) 120, an engine clutch 125, a motor 130 which may be an electric motor, a battery 140, a transmission 150, and wheels (or driving wheels) 190. The device for learning engine clutch delivery torque of the hybrid vehicle may include the controller 105 and the engine clutch 125.

The hybrid vehicle 100, which is a hybrid electric vehicle, may use the engine 110 and the motor 130 as power sources, and includes the engine clutch 125 existing between the engine 110 and the motor 130 so that the hybrid vehicle 100 may be operated in an electric vehicle (EV) mode in which the hybrid vehicle 100 travels by the motor 130 in a state where the engine clutch 125 is opened, and in a hybrid electric vehicle (HEV) mode in which the hybrid vehicle 100 is capable of travelling by both the motor 130 and the engine 110 in a state where the engine clutch 125 is closed.

The hybrid vehicle 100 may include a power train of a transmission mounted electric device (TMED) type in which the motor 130 is connected to the transmission 150. The hybrid vehicle 100 may provide a driving mode, such as the EV mode, which is the electric vehicle mode using only power of the motor, and the HEV mode, which uses rotational force of the engine as main power and uses rotational force of the motor as auxiliary power depending on whether the engine clutch 125 that is disposed between the engine 110 and the motor 130 is engaged (or connected). In more detail, in the hybrid vehicle 100 including a structure in which the motor 130 may be directly connected to the transmission 150, revolutions per minute (RPM) of the engine may be increased by drive of the HSG 120, power delivery and power cutoff between the engine and the motor may be performed via engagement and release of the clutch 125, a driving force may be transmitted (or transferred) to the wheels 190 through a power transmission system which may include the transmission 150, and torque of the engine may be transmitted to the motor via engagement of the clutch 125 when transmission of the engine torque is requested.

The controller 105 may include a hybrid control unit (HCU), a motor control unit (MCU), an engine control unit (ECU), and a transmission control unit (TCU).

The HCU may control starting of the engine by controlling the HSG 120 when the engine 110 stops. The HCU may be the highest controller, and may synthetically control controllers (for example, the MCU) connected to a network such as a controller area network (CAN) which is a vehicle network, and may control overall operation of the hybrid vehicle 100.

The MCU may control the HSG 120 and the motor 130. The MCU may control an output torque of the driving motor 130 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 140 into a three-phase alternating current (AC) voltage to drive the driving motor 130. The MCU may be disposed between the battery 140 and the motor 130.

The ECU may control a torque of the engine 110. The ECU may control an operating point (or a driving point) of the engine 110 through the network depending on a control signal output from the HCU, and may control the engine to output an optimal torque. The TCU may control an operation of the transmission 150.

The controller 105 may determine whether power transference of the transmission 150 transmitting the output from the engine 110 and the motor 130 is interrupted by using a sensor that may be connected (or attached) to the transmission 150. The controller 105 may determine that power transference of the transmission 150 is interrupted when the transmission 150 is in a park stage or a neutral stage.

When a gear shift stage of the transmission 150 is in the park stage or the neutral stage, the engine 110 and the motor 130 may be in a no-load state and the hybrid vehicle 100 may be in a non-movement state. In other words, when the gear shift stage is in the park stage or the neutral stage, an accelerator is not operated so that the vehicle may not be operated. For example, the controller 105 may determine whether the gear shift stage is in the park stage or the neutral stage by using an inhibitor switch.

When power transference of the transmission 150 is interrupted, the controller 105 may control a speed of the motor 130 to be maintained at a first speed. The controller 105 may calculate a first delivery torque of the engine clutch 125 based on the first speed and a second speed of the motor 130 which is generated after the engine clutch 125 that connects the engine 110 with the motor 130 or disconnects the engine 110 from the motor 130 is engaged. The second speed of the motor 130 may be generated by the engine 110 (or a speed of the engine 110) having a specific speed.

The controller 105 may control the speed of the motor 130 to be maintained at the second speed by releasing the engine clutch 125 after the first delivery torque is calculated. The controller 105 may calculate a second delivery torque of the engine clutch 125 based on the second speed and a third speed of the motor 130 which is generated after the engine clutch 125 is engaged. The third speed of the motor 130 may be generated by the engine 110 having the specific speed.

For example, the first delivery torque may be a product of a moment of inertia of the motor 130 and a value obtained by subtracting the first speed from the second speed. The second delivery torque may be a product of a moment of inertia of the motor 130 and a value obtained by subtracting the second speed from the third speed.

The controller 105 may control the speed of the motor 130 to be maintained at the third speed by releasing the engine clutch 125 after the second delivery torque is calculated. The controller 105 may calculate a third delivery torque of the engine clutch 125 based on the third speed and a fourth speed of the motor 130 which is generated after the engine clutch 125 is engaged. For example, the third clutch torque may be a product of a moment of inertia of the motor 130 and a value obtained by subtracting the third speed from the fourth speed. The fourth speed of the motor 130 may be generated by the engine 110 having the specific speed.

The controller 105 may determine whether the third speed is less than or equal to a learning limit speed which restricts learning for delivery torque (or transfer torque) of the engine clutch 125. When the third speed is less than or equal to the learning limit speed, the controller 105 may terminate learning for delivery torque of the engine clutch 125. The speed of the engine 110 may be different from the first speed, the second speed, and the third speed.

The delivery torque of the engine clutch 125 such as the first delivery torque, the second delivery torque, or the third delivery torque may mean torque of the engine 110 that is transmitted to the motor 130 via the engine clutch 125. The delivery torque of the engine clutch 125 may be used to determine a characteristic change of the engine clutch. In other words, the delivery torque of the engine clutch 125 may be used as characteristic information of the engine clutch that is required when the hybrid vehicle 100 is traveling in the HEV mode. The delivery torque of the engine clutch 125 may be used as information (e.g., hydraulic pressure supplied to the engine clutch) for engagement of the engine clutch that is required when the hybrid vehicle 100 is traveling in the HEV mode. The hydraulic pressure may prevent clutch engagement shock of the engine clutch.

For example, the controller 105 may be one or more microprocessors operated by a program or hardware including the microprocessor, as explained above. The program may include a series of commands for executing a method for learning engine clutch delivery torque of the hybrid vehicle according to embodiments of the present disclosure, which will be described below.

The engine 110 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 130 in the HEV mode.

The HSG 120 may operate as a motor depending on a control signal output from the MCU to start the engine 110, and may operate as a generator in a state in which start of the engine 110 is maintained to provide generated electric power to the battery 140 via the inverter. The HSG 120 may be connected to the engine 110 through a belt.

The engine clutch 125 may be disposed (or mounted) between the engine 110 and the driving motor 130, and may be operated to switch power delivery between the engine 110 and the motor 130. The engine clutch 125 may connect or intercept power between the engine and the motor depending on switching of the HEV mode and the EV mode. Operation of the engine clutch 125 may be controlled by the controller 105.

The motor 130 may be operated by a three-phase AC voltage that is output from the MCU to generate a torque. The motor 130 may be operated as a generator during coasting drive or regenerative braking to supply a voltage (or regenerative energy) to the battery 140.

The battery 140 may include a plurality of unit cells. A high voltage for providing a driving voltage (e.g., 350-450 V DC) to the motor 130 that provides driving power to the wheels 190 may be stored in the battery 140.

The transmission 150 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 150 may transmit driving force of the engine 110 and/or the motor 130 to the wheels 190, and may intercept power delivery between the motor 130 (or the engine 110) and the wheels 190.

As described above, the hybrid vehicle 100 (or the controller 105) may learn (or estimate) and update engine clutch delivery torque depending on multiple speeds by using multiple speed control (or no-load torque compensation control) of the driving motor 130 in a learning time (e.g., the park stage or the neutral stage of the transmission 150) of the engine clutch delivery torque.

The controller 105 may determine an engagement speed region that is a transient region, in which a change in speed of the motor is large when the engine clutch 125 is engaged. The engagement speed region may be a slow-speed area (e.g., about 1100-2000 RPM) of the motor.

Figure 2:
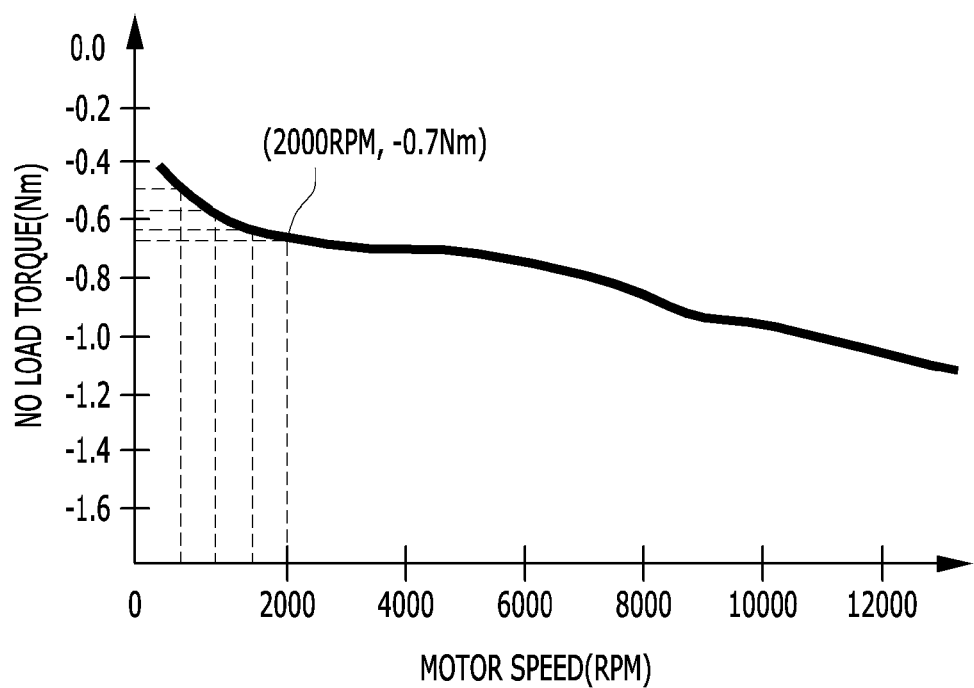
FIG. 2 is a graph for explaining no-load torque that constantly maintains the speed of the motor shown in FIG. 1.

FIG. 2 is a graph for explaining no-load torque that constantly maintains the speed of the motor shown in FIG. 1.

The controller 105 may perform no-load torque compensation control to generate no-load torque shown in FIG. 2. The no-load torque compensation control may mean control that generates torque (or compensation torque) applied to the motor 130 in order to constantly maintain the speed (or a rotation speed) of the motor in a state (e.g., the park stage or the neutral stage of the transmission 150) in which a load is not connected to the motor.

In more detail, the controller 105 may increase the speed of the motor 130 to a specific speed by generating a motor torque command so that the controller may perform the no-load torque compensation control to maintain the specific speed. The controller 105 may provide a no-load motor torque command depending on the speed of the motor 130 to the inverter that provides the three-phase AC voltage to the motor based on a no-load torque graph shown in FIG. 2. For example, the controller 105 may control the inverter to output a current (or a voltage) corresponding to 0.7 Nm of torque (i.e., no-load torque), in order to maintain the speed of the motor 130 at 2000 RPM in the no-load state (e.g., the park stage or the neutral stage of the transmission). Therefore, in the no-load state, the speed of the motor 130 may be kept constant with minimum compensation. The value of the no-load torque may be given in hardware specifications of the motor.

Figure 3:
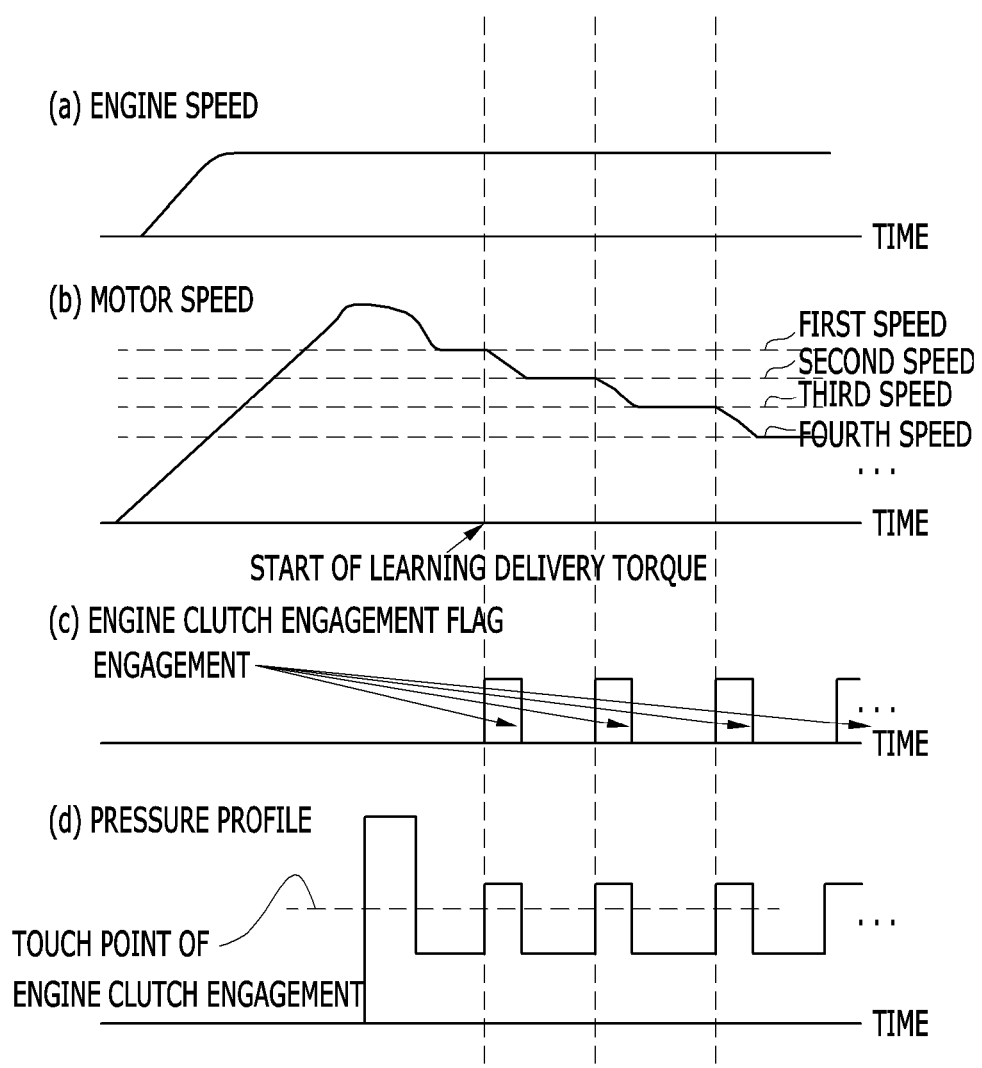
FIG. 3 is a view representing the speed of the motor used for calculating the delivery torque of the engine clutch shown in FIG. 1.

FIG. 3 is a view representing the speed of the motor used for calculating the delivery torque of the engine clutch shown in FIG. 1.

As shown in FIGS. 1 and 3, the controller 105 may control the engine 110 (i.e., a rotational speed) of the engine 110 to become the specific speed after the controller 105 starts the engine 110. The controller 105 may perform the no-load torque compensation control for the motor 130, and may control the speed of the motor 130 to be maintained at the first speed, the second speed, or an nth speed, as shown in FIG. 3. The n may be a natural number that is three or more.

The engagement of the engine clutch 125 in the no-load state may act as a load of the motor 130 to cause a change in speed of the motor 130. The change in speed of the motor 130 may include an increase in speed of the motor or a decrease in speed of the motor, and the decreased speed of the motor may include the second speed and the nth speed. For example, the first speed, the second speed, and the nth speed may be higher than the specific speed of the engine 110. Additionally, or alternatively, the specific speed of the engine 110 may have a different value from the first speed, the second speed, and the nth speed.

In order to estimate (or calculate) the delivery torque of the engine clutch 125 in multiple speeds of the motor, the controller 105 may use two speeds determined by the engagement and the release of the engine clutch and inertia (i.e., inertial mass or moment of inertia) of the motor, as demonstrated in the Equations below. The moment of inertia may mean a rotational moment of inertia.

First delivery torque=the inertia of the motor×(the second speed of the motor−the first speed of the motor)

Second delivery torque=the inertia of the motor×(the third speed of the motor−the second speed of the motor)

An $n$−1th delivery torque=the inertia of the motor× (the $n$th speed of the motor−an $n$−1th speed of the motor)  [Equations]

In the equation, n may be a natural number that is four or more. Notably, the delivery torque can be calculated using the Equations above, but the delivery torque may otherwise be calculated by different known methods.

A calculation period of the delivery torque may be the same as an engagement period of the engine clutch 125. The engine clutch 125 may be engaged by pressure of a fluid (e.g., oil) that is shown in FIG. 3 and is supplied to the engine clutch 125. The pressure of fluid for engaging the engine clutch 125 may be pressure above a touch point (or a kiss point) that is start engagement pressure of the engine clutch, and may be controlled by the controller 105. The kiss point may be a starting point of torque delivery, and may be the pressure of the fluid that converts a state of the engine clutch into a slip state in which the clutch starts friction. The pressure of fluid may correspond to a current applied to a solenoid valve of the engine clutch 125 for adjusting the pressure of the fluid. As the current applied to the solenoid valve increases, the pressure of fluid supplied to two friction members that are included in the engine clutch 125 may increase. When the pressure of fluid applied to the friction members increases, contact frictional force of the friction members may increase. Accordingly, torque transmitted by the engine clutch may be increased in proportion to the current applied to the solenoid valve.

Using the delivery torque, the pressure for engaging the engine clutch 125, and the equation below, the controller 105 may calculate a factor regarding the engagement pressure and the delivery torque using the Equation below.

factor=the engagement pressure/the delivery torque  [Equation]

The factor may be a coefficient to indicate a correlation among a friction coefficient of a friction member included in the engine clutch, the current applied to the solenoid valve, and the delivery torque.

The factor may be a factor depending on temperature of the engine clutch that corresponds to ΔRPM of the following Equation.

$$\Delta \text{RPM} = \text{speed of the engine} - \text{speed of the motor} \quad \text{[Equation] 5}$$

Figure 4:
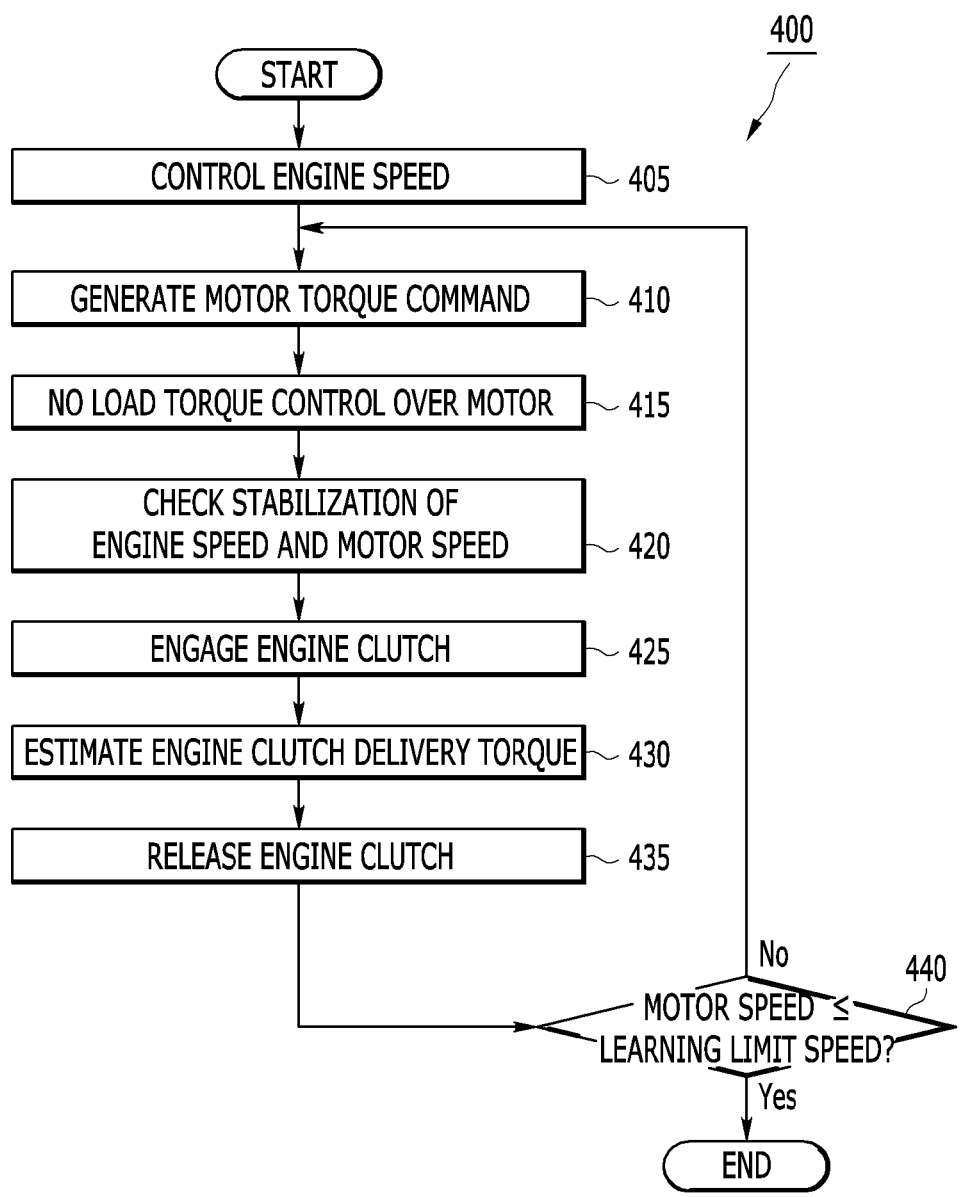
FIG. 4 is a flowchart describing a method for learning engine clutch delivery torque of the hybrid vehicle according to embodiments of the present disclosure.

FIG. 4 is a flowchart describing the method for learning engine clutch delivery torque of the hybrid vehicle according to embodiments of the present disclosure.

The method 400 for learning engine clutch delivery torque of the hybrid vehicle may be applied to the hybrid vehicle 100 including the device for learning engine clutch delivery torque shown in FIG. 1.

As shown in FIGS. 1 through 4, in an engine speed control step 405, the controller 105 may control the rotational speed of the engine 110 to be maintained at the specific speed.

After the rotational speed of the engine 110 becomes the specific speed, the controller 105 may determine whether power transference of the transmission 150 is interrupted. In another exemplary embodiment of the present disclosure, the step of determining whether power transference of the transmission 150 is interrupted may be performed before the engine speed control step 405. The controller 105 may determine that power transference of the transmission 150 is interrupted when the transmission 150 is in the park stage or the neutral stage.

According to a motor torque command generating step 410, when power transference of the transmission 150 is interrupted, the controller 105 may generate a motor torque command that is applied to the inverter.

According to a motor no-load torque control step 415, in order to constantly maintain a rotational speed of the motor 130 based on the motor torque command in the state in which a load is not connected to the motor, no-load torque compensation control for the motor 130 in which the compensation torque that is applied to the motor is generated may be performed by the controller 105. By the compensation torque, the speed of the motor 130 may be maintained at the first speed. That is, the controller 105 may control the speed of the motor 130 to be maintained at the first speed.

According to a stabilization checking step 420, the controller 105 may check whether the speed of the engine 110 and the first speed that is the speed of the motor 130 are stabilized.

According to an engagement step 425, after the speed of the engine 110 and the first speed that is the speed of the motor 130 are stabilized, the controller 105 may control the engine clutch 125 to be engaged.

According to a calculation step 430, the controller 105 may calculate the first delivery torque of the engine clutch 125 by using the first speed and the second speed of the motor 130 which is generated after the engine clutch 125 that connects the engine 110 with the motor 130 or disconnects the engine 110 from the motor 130 is engaged. For example, the first delivery torque may be a product of a moment of inertia of the motor 130 and a value obtained by subtracting the first speed from the second speed. For example, the second speed may be slower than the first speed.

According to a release stage 435, the controller 105 may control the engine clutch 125 to be released after the first delivery torque is calculated.

According to a comparison step 440, the controller 105 may determine (or check) whether the speed of the motor 130 is less than or equal to the learning limit speed (e.g., 1000 RPM) which restricts learning for delivery torque (or transfer torque) of the engine clutch 125.

When the speed of motor 130 is greater than the learning limit speed, a process that is the method 400 for learning engine clutch delivery torque of the hybrid vehicle proceeds to the motor torque command generating step 410. When the speed of motor 130 is less than or equal to the learning limit speed, the process is terminated.

The controller 105 may learn (or detect) a multiple delivery torque including the first delivery torque, the second delivery torque, and the n−1th delivery torque by the method 400 for learning engine clutch delivery torque of the hybrid vehicle. The n may be a natural number that is four or more.

The speed of the engine 110 may be different from the first speed, the second speed, and the nth speed. The n may be a natural number that is three or more.

Embodiments of the method 400 for learning engine clutch delivery torque of the hybrid vehicle will be described as follows.

The controller 105 may control the speed of the motor 130 to be maintained at the second speed by releasing the engine clutch 125 after the first delivery torque is calculated. The controller 105 may calculate the second delivery torque of the engine clutch 125 based on the second speed and the third speed of the motor 130 which is generated after the engine clutch 125 is engaged. For example, the second delivery torque may be a product of a moment of inertia of the motor 130 and a value obtained by subtracting the second speed from the third speed. The third speed may be slower than the second speed.

The controller 105 may control the speed of the motor 130 to be maintained at the third speed by releasing the engine clutch 125 after the second delivery torque is calculated. The controller 105 may calculate the third delivery torque of the engine clutch 125 based on the third speed and the fourth speed of the motor 130 which is generated after the engine clutch 125 is engaged. For example, the third clutch torque may be a product of a moment of inertia of the motor 130 and a value obtained by subtracting the third speed from the fourth speed. The fourth speed may be slower than the third speed.

The controller 105 may determine whether the third speed is less than or equal to the learning limit speed. When the third speed is less than or equal to the learning limit speed, the controller 105 may terminate learning for delivery torque of the engine clutch 125.

As described above, the present disclosure may learn (or detect) the multiple delivery torque of the engine clutch 125 within acceptable limits of the speed of the motor 130 by repeating engagement and release of the engine clutch after performing no-load torque control that maintains the speed of the motor in the multiple speeds of the motor.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

DESCRIPTION OF SYMBOLS

105: controller
110: engine
125: engine clutch
130: motor
150: transmission

What is claimed is:

1. A method for learning engine clutch delivery torque of a hybrid vehicle, the method comprising:
    determining, by a controller, whether power transference of a transmission transmitting output from an engine of the vehicle and a motor of the vehicle is interrupted;
    controlling, by the controller, a speed of the motor to be maintained at a first speed when the power transference of the transmission is interrupted;
    calculating, by the controller, a first delivery torque of an engine clutch that connects the engine with the motor or disconnects the engine from the motor, based on the first speed and a second speed of the motor which is generated after the engine clutch is engaged;
    controlling, by the controller, the speed of the motor to be maintained at the second speed by releasing the engine clutch after the first delivery torque is calculated; and
    calculating, by the controller, a second delivery torque of the engine clutch based on the second speed and a third speed of the motor which is generated after the engine clutch is engaged.

2. The method of claim 1, further comprising:
    determining, by the controller, that the power transference of the transmission is interrupted when the transmission is in a park stage or a neutral stage.

3. The method of claim 1, further comprising:
    controlling, by the controller, the speed of the motor to be maintained at the third speed by releasing the engine clutch after the second delivery torque is calculated; and
    calculating, by the controller, a third delivery torque of the engine clutch based on the third speed and a fourth speed of the motor which is generated after the engine clutch is engaged.

4. The method of claim 3, further comprising:
    determining, by the controller, whether the third speed is less than or equal to a learning limit speed which restricts learning for delivery torque of the engine clutch; and
    terminating, by the controller, learning for delivery torque of the engine clutch when the third speed is less than or equal to the learning limit speed.

5. The method of claim 1, wherein:
    the first delivery torque is a product of a moment of inertia of the motor and a value obtained by subtracting the first speed from the second speed, and
    the second delivery torque is a product of the moment of inertia of the motor and a value obtained by subtracting the second speed from the third speed.

6. The method of claim 1, wherein a speed of the engine is different from the first speed and the second speed.

7. A device for learning engine clutch delivery torque of a hybrid vehicle, the device comprising:
    an engine clutch which connects an engine of the vehicle with a motor of the vehicle or disconnects the engine from the motor; and
    a controller which controls a speed of the motor to be maintained at a first speed when power transference of a transmission transmitting output from the engine and the motor is interrupted, calculates a first delivery torque of the engine clutch based on the first speed and a second speed of the motor which is generated after the engine clutch is engaged, controls the speed of the motor to be maintained at the second speed by releasing the engine clutch, and calculates a second delivery torque of the engine clutch based on the second speed and a third speed of the motor which is generated after the engine clutch is engaged.

8. The device of claim 7, wherein the controller determines that the power transference of the transmission is interrupted when the transmission is in a park stage or a neutral stage.

9. The device of claim 7, wherein the controller:
    controls the speed of the motor to be maintained at the third speed by releasing the engine clutch, and
    calculates a third delivery torque of the engine clutch based on the third speed and a fourth speed of the motor which is generated after the engine clutch is engaged.

10. The device of claim 9, wherein the controller:
    determines whether the third speed is less than or equal to a learning limit speed which restricts learning for delivery torque of the engine clutch, and
    terminates learning for delivery torque of the engine clutch when the third speed is less than or equal to the learning limit speed.

11. The device of claim 7, wherein:
    the first delivery torque is a product of a moment of inertia of the motor and a value obtained by subtracting the first speed from the second speed, and
    the second delivery torque is a product of the moment of inertia of the motor and a value obtained by subtracting the second speed from the third speed.

12. The device of claim 7, wherein a speed of the engine is different from the first speed and the second speed.

13. A non-transitory computer readable medium containing program instructions for learning engine clutch delivery torque of a hybrid vehicle, the computer readable medium comprising:
    program instructions that determine whether power transference of a transmission transmitting output from an engine of the vehicle and a motor of the vehicle is interrupted;
    program instructions that control a speed of the motor to be maintained at a first speed when the power transference of the transmission is interrupted;
    program instructions that calculate a first delivery torque of an engine clutch that connects the engine with the motor or disconnects the engine from the motor, based on the first speed and a second speed of the motor which is generated after the engine clutch is engaged;

program instructions that control the speed of the motor to be maintained at the second speed by releasing the engine clutch after the first delivery torque is calculated; and program instructions that calculate a second delivery torque of the engine clutch based on the second speed and a third speed of the motor which is generated after the engine clutch is engaged.

* * * * *